US012777371B2

(12) United States Patent
Sharma et al.

(10) Patent No.: US 12,777,371 B2
(45) Date of Patent: Oct. 27, 2026

(54) TRAFFIC MANAGEMENT TO REDUCE CELLULAR NETWORK OUTAGES

(71) Applicant: T-Mobile USA, Inc., Bellevue, WA (US)

(72) Inventors: Anuj Sharma, Broadlands, VA (US); Deepesh Belwal, Ashburn, VA (US); Anil Kumar Mariyani, Ashburn, VA (US)

(73) Assignee: T-Mobile USA, Inc., Bellevue, WA (US)

( * ) Notice: Subject to any disclaimer, the term of this patent is extended or adjusted under 35 U.S.C. 154(b) by 114 days.

(21) Appl. No.: 18/582,639

(22) Filed: Feb. 20, 2024

(65) Prior Publication Data

US 2025/0267513 A1 Aug. 21, 2025

(51) Int. Cl.
*H04W 28/086* (2023.01)

(52) U.S. Cl.
CPC ............................... *H04W 28/0861* (2023.05)

(58) Field of Classification Search
CPC .............. H04W 28/0861; H04W 28/086–0992
See application file for complete search history.

(56) References Cited

U.S. PATENT DOCUMENTS 10,251,103 B2 * 4/2019 Henderson ........ H04W 28/0284
2005/0021713 A1 * 1/2005 Dugan ................. H04Q 3/0029 709/246
2007/0124437 A1 * 5/2007 Chervets ............... H04L 41/069 709/223
2012/0208562 A1 * 8/2012 Wilkin ................ H04L 41/5067 455/456.3
2012/0309320 A1 * 12/2012 Thyagarajan ......... H04L 41/142 455/67.11
2015/0065121 A1 * 3/2015 Gupta ................... H04W 28/04 455/424
2016/0013991 A1 * 1/2016 Parker ................. H04L 41/0894 705/7.33
2016/0112275 A1 * 4/2016 Park .................... H04L 41/0681 709/224

(Continued)

OTHER PUBLICATIONS

"Fault Management: IT System for Managing Alarms in theTelecom Network," Network Fault Management system Telecom | Comarch, Retrieved on Dec. 4, 2023, 10 pages.

*Primary Examiner* — Patrice L Winder
(74) *Attorney, Agent, or Firm* — Foley IP Law, PLLC

(57) ABSTRACT

A traffic orchestrator reduced cellular network outages via improved traffic management. The orchestrator receives network management logs and call logs from network nodes and uses them, along with key performance indicators (KPIs) for network nodes, traffic patterns, and network topology, to identify nodes that are operating in a degraded manner, or are not fit for traffic. The orchestrator generates and distributes traffic advisories to various network nodes. This rebalances traffic to reduce losses to traffic throughput, such as by rerouting traffic around degraded nodes and nodes that are not fit for traffic. This proactive approach occurs prior to a network node being reported as unavailable to a network repository (e.g., a 5G NRF), and not only enables some of the degraded nodes an opportunity to recover prior to an outage (reducing outages), but also reroutes traffic prior to impending outages, reducing the effect on users when outages.

20 Claims, 8 Drawing Sheets

(56) References Cited

U.S. PATENT DOCUMENTS

| | | | | |
|---|---|---|---|---|
| 2017/0078171 | A1* | 3/2017 | Tapia | H04L 41/5009 |
| 2017/0127427 | A1* | 5/2017 | Claridge | H04W 72/542 |
| 2017/0134984 | A1* | 5/2017 | Gillblad | H04W 28/0861 |
| 2018/0234902 | A1* | 8/2018 | Talbert | H04W 84/12 |
| 2019/0149396 | A1* | 5/2019 | Zafer | H04L 41/069<br>709/224 |
| 2019/0394655 | A1* | 12/2019 | Rahman | H04L 41/142 |
| 2022/0240123 | A1* | 7/2022 | Zeng | H04W 28/0268 |
| 2023/0047057 | A1* | 2/2023 | Kurt | H04L 41/0823 |
| 2024/0054124 | A1* | 2/2024 | Nikain | G06F 16/2358 |
| 2024/0114362 | A1* | 4/2024 | Wang | H04W 24/04 |
| 2024/0236709 | A1* | 7/2024 | Khalid | H04L 67/148 |

* cited by examiner

TRAFFIC MANAGEMENT TO REDUCE CELLULAR NETWORK OUTAGES

BACKGROUND

Modern wireless networks (e.g., cellular networks) are implemented using a plethora of different networking nodes working in tandem to provide wireless services to large numbers of customers. The various networking nodes interact with each other on different interfaces (northbound/southbound/sideways) to keep the traffic flowing connected over a TCP/IP network.

A primary challenge in providing seamless, reliable service to users arises as a result of different networking nodes experiencing different types of degradation issues due to hardware, software, and networking faults, or a combination. This often results in disruption of services which is either corrected automatically, using network resilience measures such as failover routes, or by manual intervention.

In current cellular networks, such as 5G, in addition to some network nodes performing their own local resilience measures, a network resource function (NRF) tracks network node availability as a network resilience measure. If the NRF detects that a network node has become unavailable, such as by a reported outage, a loss of a "heartbeat" signal, or a failure to respond to a repeated ping, the NRF marks the network node as unsuitable for handling traffic. The NRF will no longer identify that unavailable node to other network nodes requesting a resource. Even if the process of identifying a newly-unavailable network node is rapid, to minimize the number of other network nodes that are steered to it, and moving traffic to alternate network nodes (e.g., failover routes) is rapid, this process is still reactive. Network users whose traffic had been passing through the newly-unavailable network node may have noticed a performance degradation, such as dropped packets or delays, leading to poor user experiences.

SUMMARY

The following summary is provided to illustrate examples disclosed herein, but is not meant to limit all examples to any particular configuration or sequence of operations.

Solutions are disclosed that provide improved traffic management to reduce cellular network outages. Examples include: receiving network management logs from network nodes of a wireless network; receiving call logs from network nodes of the wireless network; using the network management logs, the call logs, traffic patterns of the wireless network, network topology of the wireless network, and key performance indicators (KPIs) for network nodes of the wireless network, generating traffic advisories for rebalancing traffic in the wireless network to reduce losses to traffic throughput; and distributing the traffic advisories to network nodes of the wireless network.

BRIEF DESCRIPTION OF THE DRAWINGS

The disclosed examples are described below with reference to the accompanying drawing figures listed below, wherein.

Figure 1:
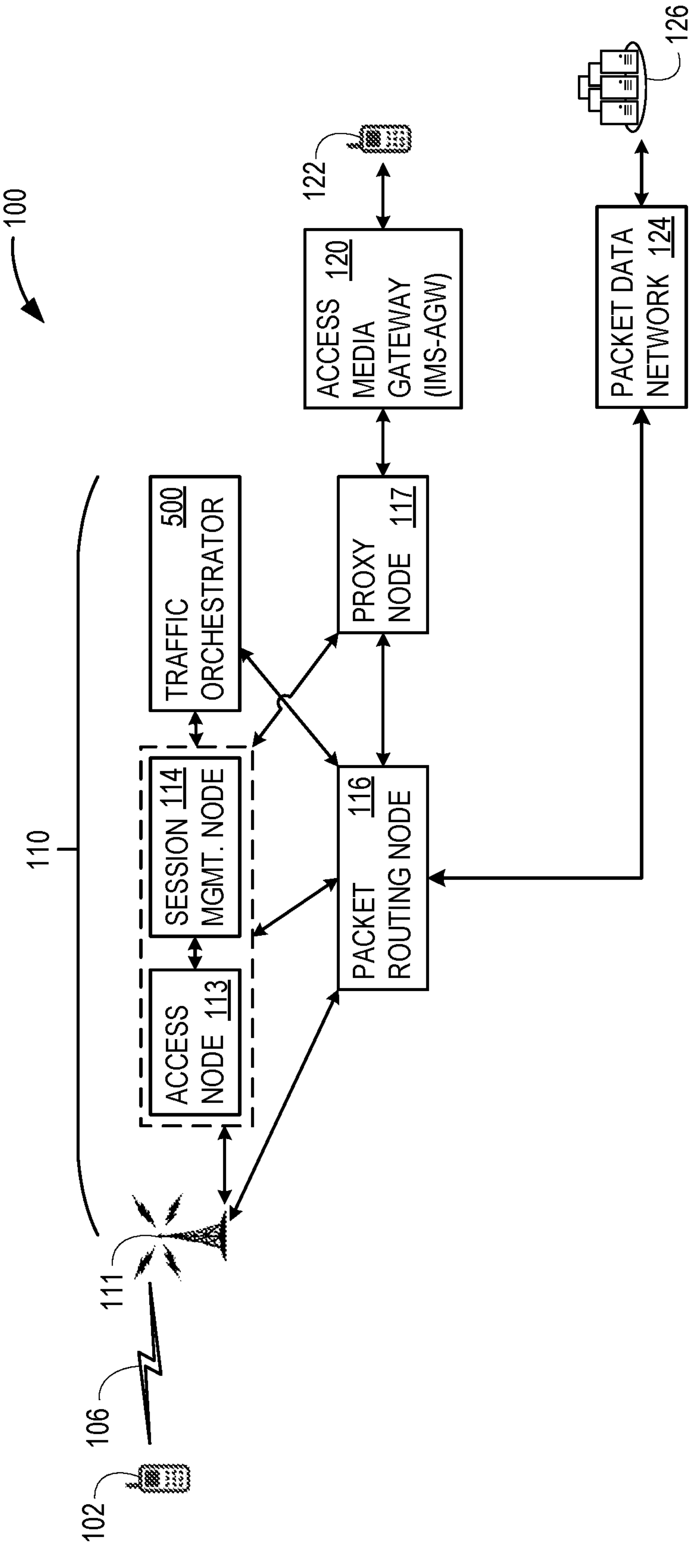
FIG. 1 illustrates an exemplary architecture that advantageously improve traffic management to reduce cellular network outages.

Corresponding reference characters indicate corresponding parts throughout the drawings. References made throughout this disclosure, relating to specific examples, are provided for illustrative purposes, and are not meant to limit all implementations or to be interpreted as excluding the existence of additional implementations that also incorporate the recited features.

DETAILED DESCRIPTION

A traffic orchestrator reduced cellular network outages via improved traffic management. The orchestrator receives network management logs and call logs from network nodes and uses them, along with key performance indicators (KPIs) for network nodes, traffic patterns, and network topology, to identify nodes that are operating in a degraded manner, or are not fit for traffic. The orchestrator generates and distributes traffic advisories to various network nodes. This rebalances traffic to reduce losses to traffic throughput, such as by rerouting traffic around degraded nodes and nodes that are not fit for traffic. This proactive approach occurs prior to a network node being reported as unavailable to a network repository (e.g., a 5G NRF), and not only enables some of the degraded nodes an opportunity to recover prior to an outage (reducing outages), but also reroutes traffic prior to impending outages, reducing the effect on users when outages do occur.

Some examples further identify anomalies in call logs, such as missing call event logs, which could lead to security issues and/or revenue leak (e.g., an unauthorized subscriber using the network). In such cases, additional traffic advisories are generated and distributed to initiate an automatic corrective action for the identified anomaly (e.g., trigger network nodes to address the missing call event) or generate an alert for a network operations center (NOC) so that the issue may be addressed in a timely manner. Some examples use artificial intelligence (AI) or machine learning (ML), used effectively synonymously here, for the identifications of impending outages and/or call log anomalies and also may use AI/ML for the generation of the traffic advisories. Some examples are capable of self-learning, starting with a set of programmed rules, and then improving over time as network responses to traffic advisories are monitored and further train the AI/ML of the orchestrator.

Aspects of the disclosure improve the reliability of cellular networks by proactively identifying impending outages and rerouting traffic around (or away from) nodes that are operating in a degraded manner and nodes that are not fit for traffic, before a catastrophic outage occurs and is reported to a network repository. This reduces impact on network users by permitting some of the network nodes to recover without failing entirely (as a result of reduced traffic), and further moves traffic prior to an outage which would otherwise have negative impacts on users whose traffic had been passing through the failed node. These advantageous results are accomplished, at least in part by, using the network management logs, the call logs, traffic patterns of the wireless network, network topology of the wireless network, and KPIs for network nodes of the wireless network, generating traffic advisories for rebalancing traffic in the wireless network to reduce losses to traffic throughput.

With reference now to the figures, FIG. 1 illustrates an exemplary architecture 100 that advantageously improves traffic management to reduce cellular network outages. A wireless network 110 is illustrated that is serving a UE 102. UE 102 may be a cellular telephone, such as a smartphone, but may also represent other telecommunication devices capable of using a wireless network, such as a personal computer (PC, e.g., desktop, notebook, tablet, etc.) with a cellular modem. In the scene depicted in FIG. 1, UE 102 is using wireless network 110 for a packet data session to reach a network resource 126 (e.g., a website) across an external packet data network 124 (e.g., the internet). In some scenarios, UE 102 may use wireless network 110 for a phone call with another UE 122. Wireless network 110 may be a cellular network such as a fifth generation (5G) network, a fourth generation (4G) network, or another cellular generation network.

Figure 2:
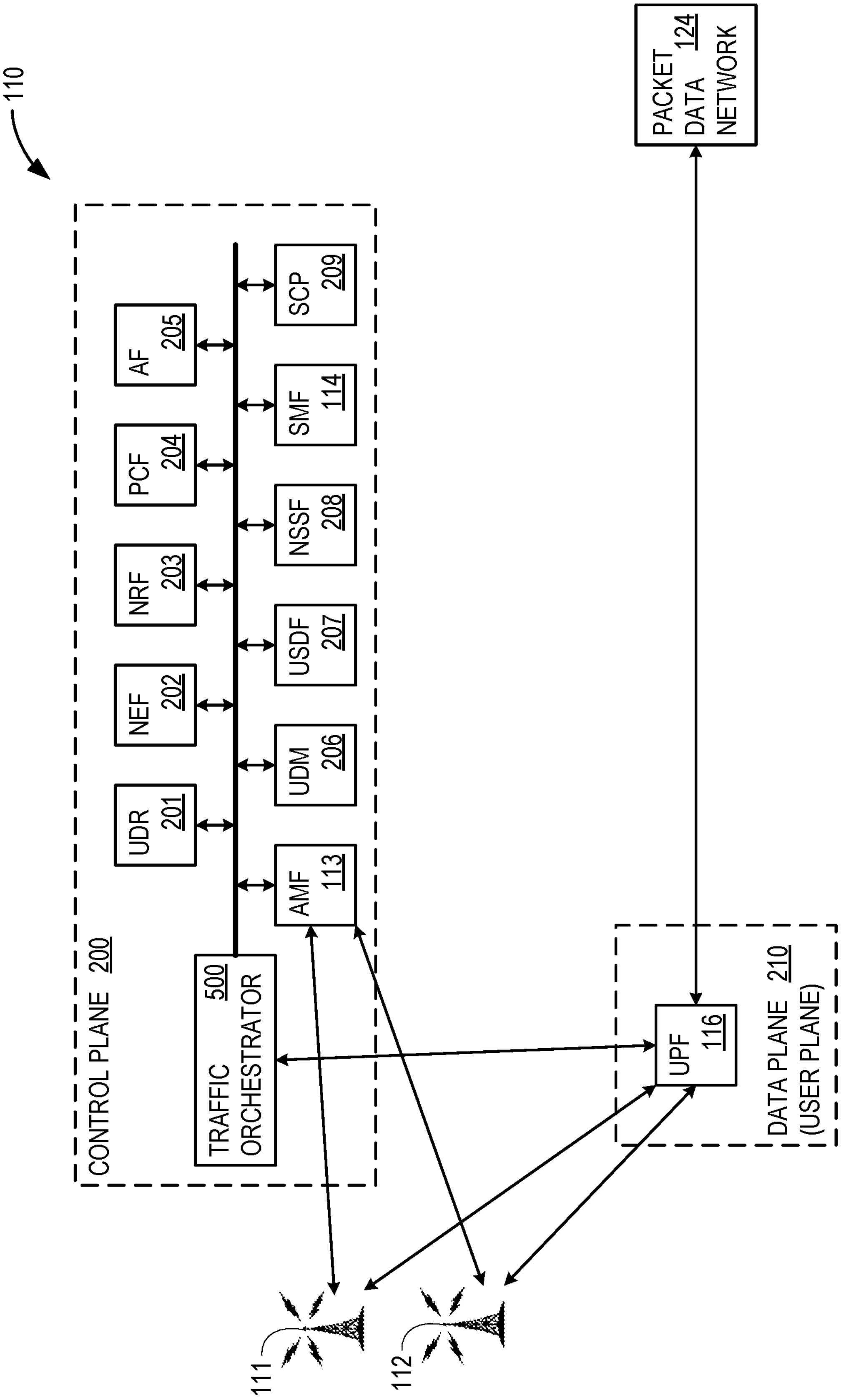
FIG. 2 illustrates an alternative representation of the wireless network of FIG. 1.

UE 102 uses an air interface 106 to communicate with a base station 111 of wireless network 110, such that base station 111 is the serving base station for UE 102 (providing the serving cell). In some scenarios, base station 111 may be referred to as a radio access network (RAN). Wireless network 110 has an access node 113, a session management node 114, a traffic orchestrator 500, and other components (not shown). Wireless network 110 also has a packet routing node 116 and a proxy node 117. Access node 113 and session management node 114 are within a control plane 200 of wireless network 110, and packet routing node 116 is within a data plane 210 of wireless network 110 (as shown in FIG. 2).

Base station 111 is in communication with access node 113 and packet routing node 116. Access node 113 is in communication with session management node 114, which is in communication with packet routing node 116 and proxy node 117. Packet routing node 116 is in communication with proxy node 117, and packet data network 124. In some 5G examples, base station 111 comprises a gNodeB (gNB), access node 113 comprises an access mobility function (AMF), session management node 114 comprises a session management function (SMF), and packet routing node 116 comprises a user plane function (UPF).

In some 4G examples, base station 111 comprises an eNodeB (eNB), access node 113 comprises a mobility management entity (MME), session management node 114 comprises a system architecture evolution gateway (SAEGW) control plane (SAEGW-C), and packet routing node 116 comprises an SAEGW-user plane (SAEGW-U). In some examples, proxy node 117 comprises a proxy call session control function (P-CSCF) in both 4G and 5G.

In some examples, wireless network 110 has multiple ones of each of the components illustrated, in addition to other components and other connectivity among the illustrated components. In some examples, wireless network 110 has components of multiple cellular technologies operating in parallel in order to provide service to UEs of different cellular generations. For example, wireless network 110 may use both a gNB and an eNB co-located at a common cell site. In some examples, multiple cells may be co-located at a common cell site, and may be a mix of 5G and 4G.

Proxy node 117 is in communication with an internet protocol (IP) multimedia system (IMS) access gateway (IMS-AGW) 120 within an IMS, in order to provide connectivity to other wireless (cellular) networks, such as for a call with UE 122 or a public switched telephone system (PSTN, also known as plain old telephone system, POTS). In some examples, proxy node 117 may be considered to be within the IMS. UE 102 reaches network resource 126 using packet data network 124 (or IMS-AGW 120, in some examples). Data packets from UE 102 pass through at least base station 111 and packet routing node 116 on their way to packet data network 124 or IMS-AGW 120 (via proxy node 117).

Traffic orchestrator 500 identifies when a network node of wireless network 110 is operating in a degraded manner, or is not fir for traffic and generates and distributes traffic advisories for rebalancing traffic in wireless network 110, to reduce losses to traffic throughput, as described in further detail below. In some examples, also described in further detail below, traffic orchestrator 500 further identifies anomalies in call log data and generates and distributes additional traffic advisories to initiate an automatic corrective actions.

Although FIG. 1 and some of the following figures are described using an example of a cellular network, it should be understood that the teachings herein are applicable to other types of wireless networks. Any wireless network that uses a backhaul with multiple network nodes, at least some of which maintain event logs, nodes may also benefit from the teachings herein. In such other network types, traffic orchestrator 500 monitors KPIs of the backhaul network nodes and harvests their event logs.

FIG. 2 illustrates an alternative representation of wireless network 110, using 5G names for network nodes. Control plane 200 includes traffic orchestrator 500, a unified data repository (UDR) 201, a network exposure function (NEF) 202, a network repository 203 shown as a network function (NF) repository function (NRF), a policy control function (PCF) 204, an application function (AF) 205, access node 113 shown as an AMF), a unified data management (UDM) 206, an unstructured data storage function (UDSF) 207, a network slice selection function (NSSF) 208, session management node 114 shown as an SMF, and a service communication proxy (SCP) 209. In some examples, control plane 200 has multiple ones of each of the nodes shown (see FIG. 3), as well as additional types of nodes (not shown), such as a home subscriber server (HSS), a telephony application server (TAS), and others.

A second base station 112 also shown for wireless network 110, which is also in communication with access node 113. Wireless network 110 may have a larger number of base stations. Data plane 210 includes packet routing node 116 shown as a UPF, and in some examples is referred to as a user plane. Traffic orchestrator 500 is in communication with all of nodes 111-113, 114, 116, and 201-209 for receiving logs and distributing traffic advisories.

Figure 3:
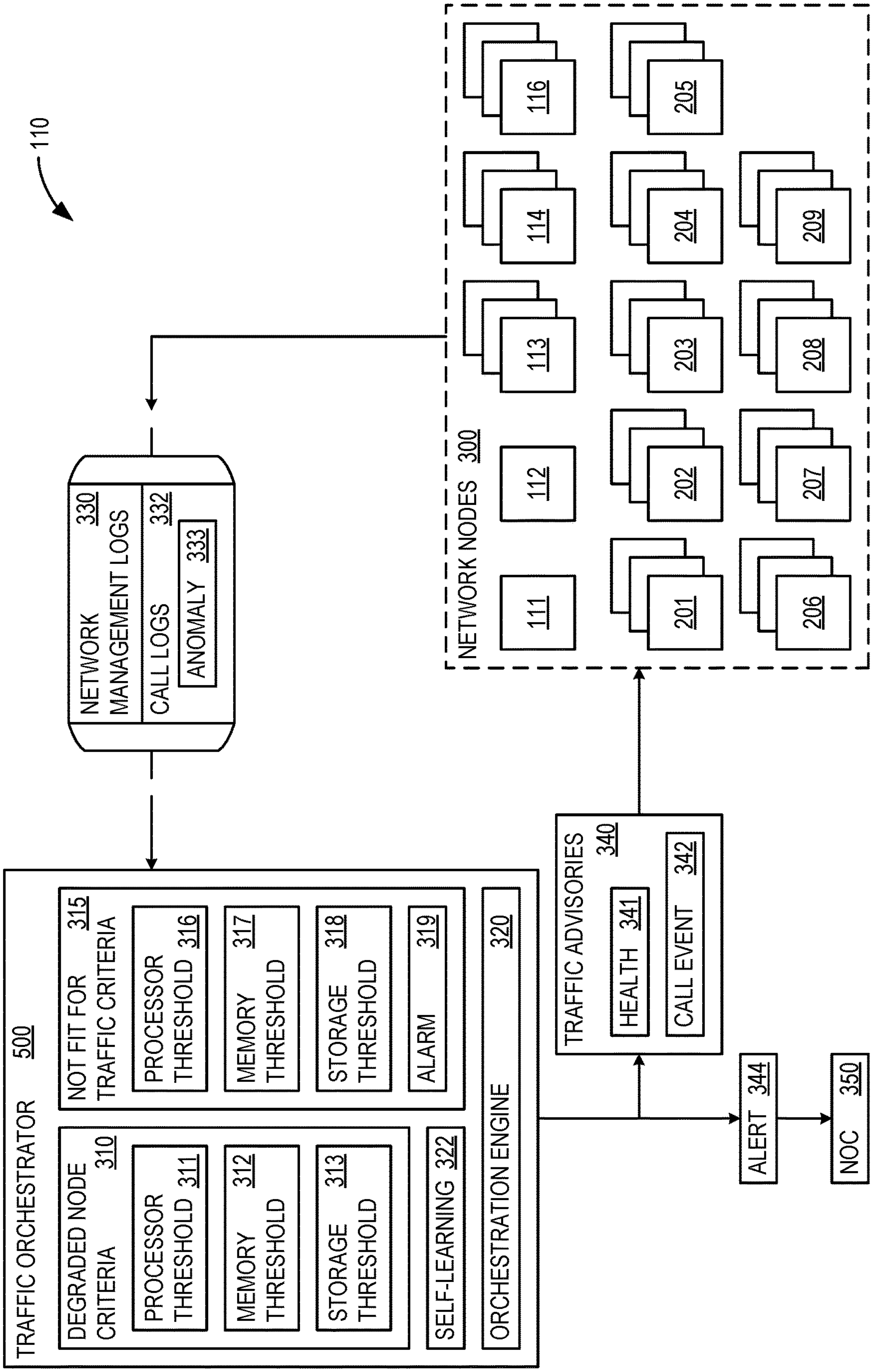
FIG. 3 illustrates example messages used in examples of the architecture of FIG. 1.

FIG. 3 illustrates example messages used in examples of architecture 100. Traffic orchestrator 500 receives network management logs 330 and call logs 332 from network nodes 300 of wireless network 110. Network nodes 300 is shown as a set of nodes 111-113, 114, 116, and 201-209, with multiple ones shown for each of nodes 113, 114, 116, and 201-209. (A larger number of base stations may also be used). In some examples, network management logs 330 comprise fault, configuration, accounting, performance and security (FCAPS) logs for network nodes of wireless network 110. Call logs 332 is shown as having an anomaly 333, which is identified and corrected as described below in relation to FIG. 5. Examples of anomaly 333 include a missing push profile request from an HSS to a TAS, and a missing cancel location request (CLR) that should have been sent to access node 113.

Traffic orchestrator 500 has an orchestration engine 320 that identifies degraded nodes (network nodes operating in a degraded manner) and network nodes that are not fit for traffic, and call event anomalies such as anomaly 333, and generates traffic advisories 340 in response. Traffic advisories 340 includes health advisories 341 for rebalancing traffic in wireless network 110 to reduce losses to traffic throughput and call event advisories 342 to initiate automatic corrective actions for identified call event anomalies.

Figure 4:
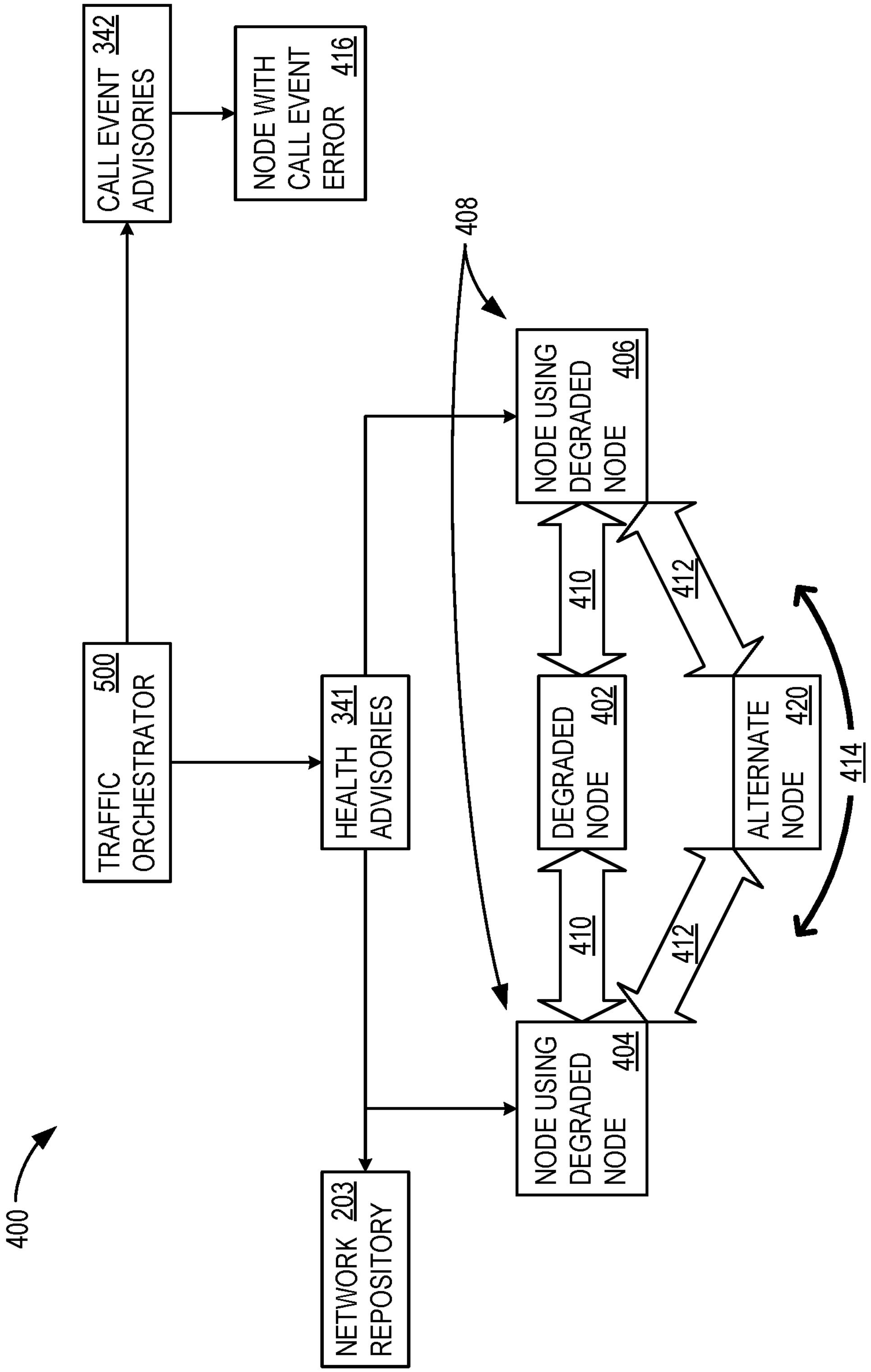
FIG. 4 illustrates a scenario of rebalancing traffic in the wireless network of FIG. 1.

Traffic orchestrator 500 distributes traffic advisories 340 to network nodes 300, as shown in further detail in FIG. 4. In some examples, traffic orchestrator 500 also generates an alert 344 in response to anomaly 333 and transmits it to a NOC 350 for other corrective action. In some examples, traffic orchestrator 500 is located within NOC 350, and/or the at least some of the functionality described herein for traffic orchestrator 500 is distributed among multiple nodes of wireless network 110.

Orchestration engine 320 uses criteria 310 for identifying a network node (of network nodes 300) as degraded, and criteria 315 for identifying a network node as not fit for traffic. Criteria 310 may include a processor load threshold 311, a memory usage threshold 312, and/or a storage usage threshold 313. Criteria 315 may include a processor load threshold 316, a memory usage threshold 317, a storage usage threshold 318, and an identification of an alarm 319 (one or more) that indicates a relatively serious condition.

Initially, criteria 310 and 315 may be set based on the experience of network operators. In some examples, orchestration engine 320 uses AI/ML that intake criteria 310 and 315 as input. A self-learning component 322 monitors whether failures actually occur following a node meeting criteria 310 or 315 (as well as other KPIs) and is able to further train orchestration engine 320 to improve its diagnosis of degraded nodes and nodes that are unfit for traffic. In such examples, criteria 310 and 315 may change over time to improve the ability of orchestration engine 320 to predict failures.

Additionally, orchestration engine 320 is initially programmed to generate and distribute traffic advisories 340 to select ones of network nodes 300, based on the experience of network operators. Self-learning component 322 also monitors responses of network nodes to traffic advisories 340, to identify which traffic advisories 340 and traffic advisory contents produce superior results, and further train orchestration engine 320 to improve traffic advisory contents and selection of network nodes 300 for receiving distribution of traffic advisories 340.

In an example, initially-programmed criteria 310 may include processor load threshold 311 set to a CPU exceeding 60% load for more than one minute, memory usage threshold 312 set to memory usage exceeding 65% for more than one minute, storage usage threshold 313 set to disk usage exceeding 75%, and traffic volume exceeding the configured limit for more than two minutes. Initially-programmed criteria 315 may include processor load threshold 316 set to a CPU exceeding 60% load for more than three minutes, memory usage threshold 317 set to memory usage exceeding 65% for more than three minutes, storage usage threshold 318 set to disk usage exceeding 85%, alarm 319 indicating some set of possible alarms related to network node health, and traffic volume exceeding the configured limit for more than two minutes.

FIG. 4 illustrates a scenario 400 of rebalancing traffic in wireless network 110 by rerouting traffic around (away from) degraded nodes and/or nodes that are not fit for traffic, as represented by traffic 410 and a network node 402 (shown as a degraded node). Network node 402 may be any of the nodes of network nodes 300 of FIG. 3.

Initially, a network node 404 and a network node 406 are both using network node 402 for traffic 410. Network nodes 404 and 406 may collectively be referred to as other network nodes 408 of wireless network 110 that are using network node 402. Although two network nodes are shown as using network node 402 for traffic 410, some examples may have more.

Traffic orchestrator 500 transmits (distributes) an initial set of health advisories 341 to network nodes 408 (network node 404 and network node 406) upon determining that network node 402 is operating in a degraded manner. In response, network node 404 and network node 406 each reroute a portion 412 of traffic 410 away from network node 402 to alternate route 414 through an alternate node 420. In some examples, health advisories 341 identifies the percentage of traffic to reroute or a new maximum amount of traffic 410 that may continue to be routed to network node 402.

Upon determining that network node 402 is not fit for traffic, traffic orchestrator 500 transmits (distributes) another set of health advisories 341 to network nodes 408. In response, network node 404 and network node 406 each reroute all of traffic 410 away from network node 402 to alternate route 414 through an alternate node 420. Additionally, a health advisory 341 is sent to network repository 203 to alert network repository 203 that network node 402 is unavailable. Network repository 203 holds availability information for network nodes of wireless network 110. When other network nodes of wireless network 110 need a resource, they consult network repository 203. If network repository 203 no longer lists network node 402 as available, no other network nodes of wireless network 110 will use network node 402. In some examples, traffic orchestrator 500 alerts network repository 203 that network node 402 is unavailable upon network node 402 entering a degraded state of operation.

Upon determining that network node 402 is once again fit for traffic and no longer operating in a degraded manner, traffic orchestrator 500 transmits (distributes) another set of health advisories 341 to network nodes 408 and network repository 203. Other nodes of wireless network 110 are now able to use network node 402 in normal operations.

FIG. 4 also shows traffic orchestrator 500 transmitting call event advisories 342 to a network node 416 that needs to perform an automatic corrective action for anomaly 333, such as deregistering an unauthorized user or initiating a network node event missing from call logs 332. This capability is able to plug revenue leaks that may otherwise occur if unauthorized sessions are not terminated, and improve network security by reducing the access by unauthorized users.

Figure 5:
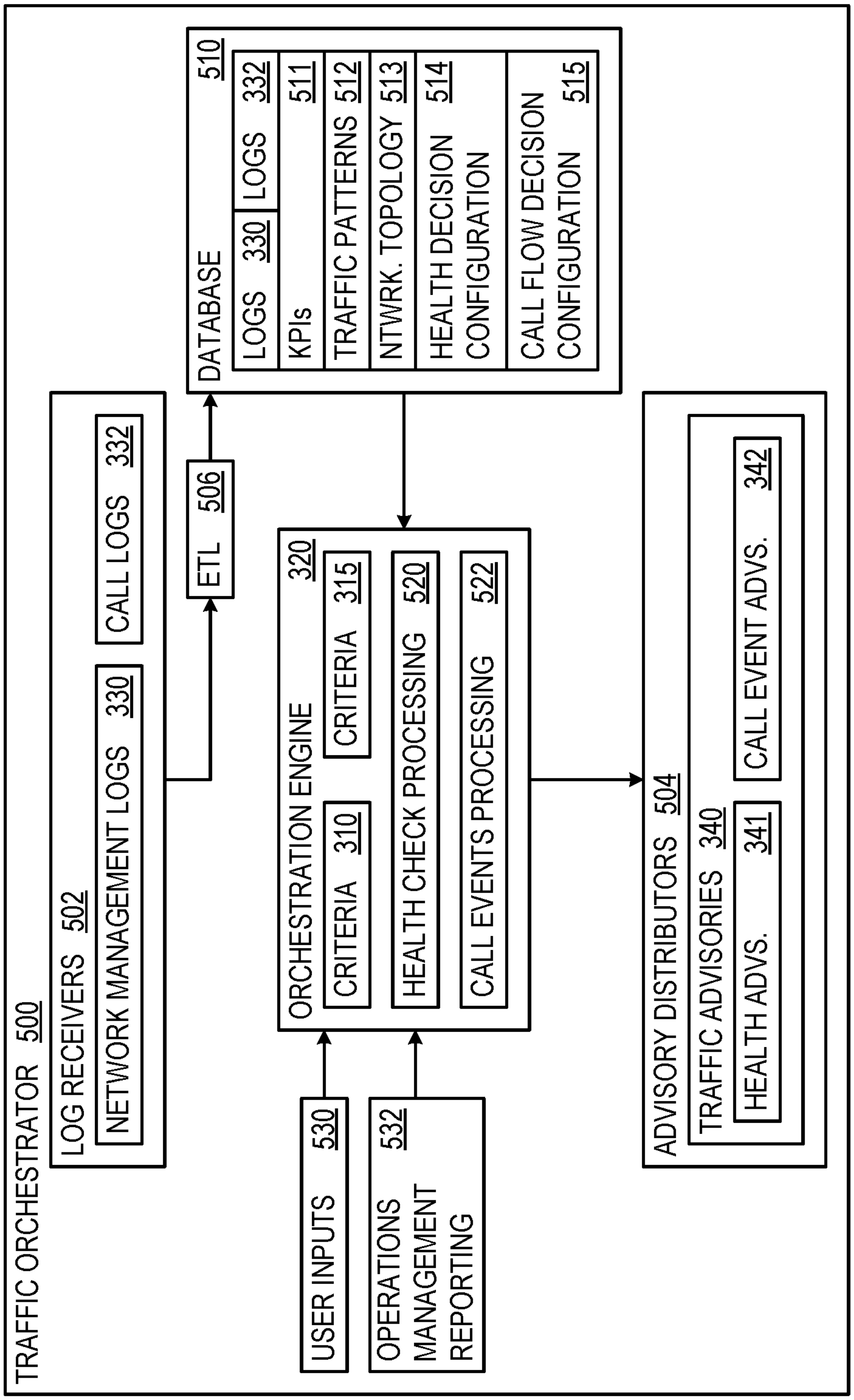
FIG. 5 illustrates further detail for the traffic orchestrator of FIG. 1.

FIG. 5 illustrates further detail for traffic orchestrator 500. A set of log receivers 502 receives network management logs 330 and call logs 332 for traffic orchestrator 500 from network nodes 300, and a set of advisory distributors 504 transmits traffic advisories 340 to selected ones of network nodes 300. An extract, transform, load (ETL) process 506 to transform network management logs 330 and call logs 332 into a form used for storage in a database 510.

In some examples, database 510 also has KPIs 511, traffic patterns 512 of wireless network 110, and network topology 513 of wireless network 110. In some examples, KPIs 511 include alarms; processor, memory usage, and storage usage data; and transactions per unit time. Network topology 513 has information about network nodes 300 and relationships among the network nodes. In some examples, database 510 also stores health decision configuration 514, which is information used by orchestration engine 320 to generate health advisories 341. For example, criteria 310 and criteria 315 may be part of health decision configuration 514, and health decision configuration 514 may be updated by either user inputs 530 or improved by self learning component 322. In some examples, database 510 also stores call flow decision configuration 515, which is information used by orchestration engine 320 to generate call event advisories 342. Call flow decision configuration 515 may updated by either user inputs 530 or improved by self learning component 322.

Orchestration engine 320 pulls information from database 510 as needed, and also receives inputs in the form of user inputs 530 (e.g., specific instructions from users related to routing traffic through wireless network 110) an operations management reporting 532. For example, some of KPIs 511, and information about alarms from network nodes 300 may be received through operations management reporting 532, if not received from network management logs 330. That is, information needed to identify whether any network nodes meet criteria 310 or criteria 315 is received through the combination of network management logs 330 and operations management reporting 532.

Orchestration engine 320 is illustrated as having a health check processing component 520 that generates health advisories 341, and a call events processing component 522 that generates call event advisories 342. Some examples may use a different architecture for orchestration engine 320. After generation, health advisories 341 and call event advisories 342 move to advisory distributors 504 for distribution to selected ones of network nodes 300.

There are multiple use cases for traffic orchestrator 500, including rebalancing traffic based on processor usage (i.e., lessening the burden on network nodes that have heavy processor loads by moving traffic to lesser-burdened network nodes), rebalancing traffic based on service response time (i.e., routing traffic away from network nodes reporting higher traffic delays (lower transactions per unit time) toward network nodes reporting lower traffic delays), and deregistering unauthorized users.

This third use case may be described with an example scenario: Traffic orchestrator 500 receives information of a provisioning event for deactivation of a registered user, and determines (based on call logs 332) that a deregister event (Nudm_UECM_DeregNotification) should be sent from UDM 206 to AMF 113, and then AMF 113 should initiate an unsubscribe for subscriber data (Nudm_SDM_Unsubscribe). However, traffic orchestrator 500 identifies, from call logs 332, that UDM 206 did not send the deregister event to AMF 113. Traffic orchestrator 500 then sends a call event advisory 342 to UDM 206, instructing UDM 206 to initiate a forced deregistration sequence. Traffic orchestrator 500 logs this action and notes it in alert 344 to NOC 350.

In some examples, traffic orchestrator 500 is able to track and correlate such events and identify trends, such as certain nodes repeatedly produce certain types of anomalies, or anomalies are correlated with certain areas or events. By issuing another alert 344 to NOC 350, such systematic issues may be identified and addressed by the operators of wireless network 110.

Figure 6:
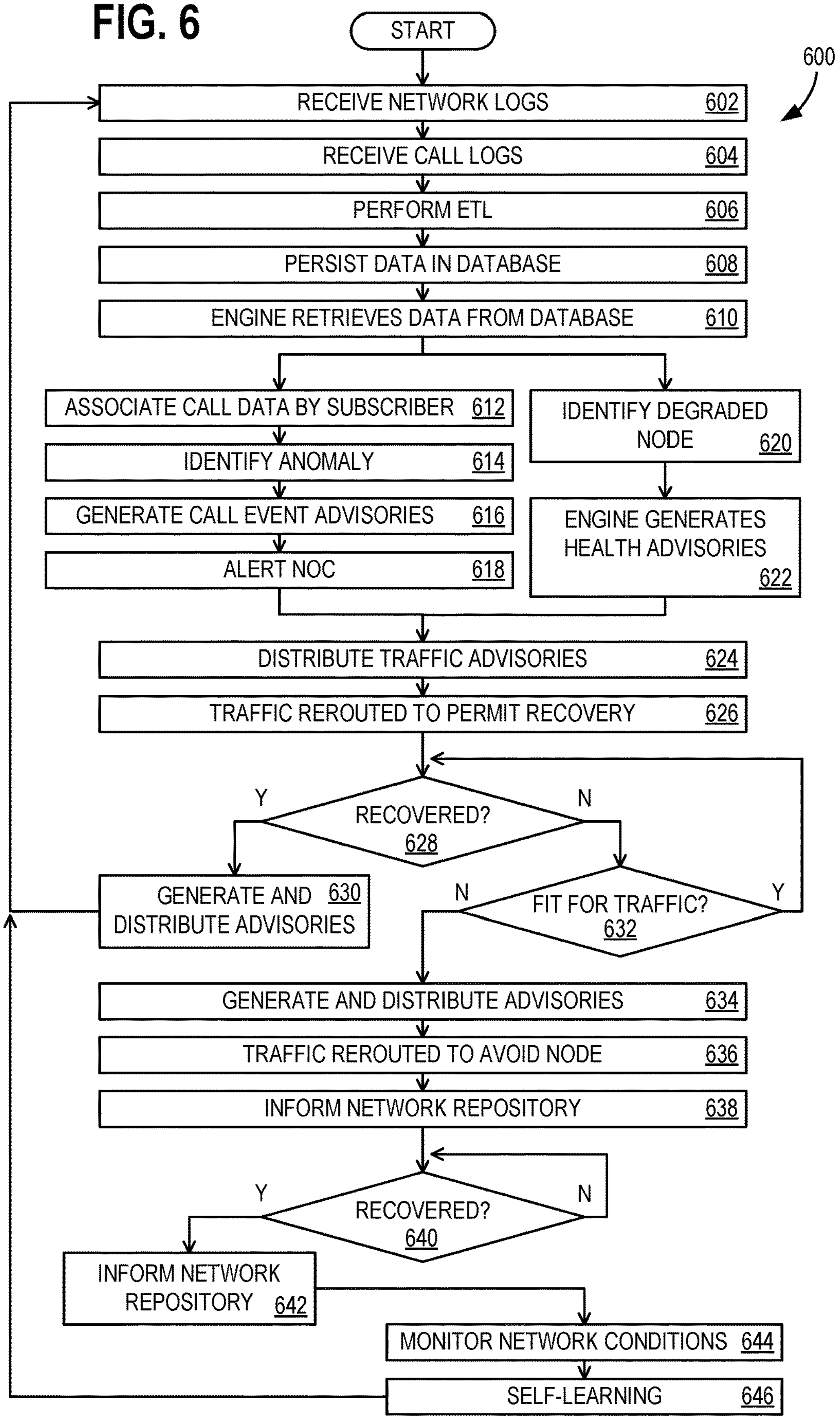
FIGS. 6 and 7 illustrate flowcharts of exemplary operations associated with the architecture of FIG. 1.

FIG. 6 illustrates a flowchart 600 of exemplary operations associated with examples of architecture 100. In some examples, at least a portion of flowchart 600 may be performed using one or more computing devices 800 of FIG. 8. Flowchart 600 commences with traffic orchestrator 500 receiving network management logs 330 from network nodes 300 in operation 602, and receiving call logs 332 from network nodes 300 in operation 604.

Operation 606 performs ETL process 506 to transform network management logs 330 and call logs 332 into a form used for storage in database 510, and operation 608 persists network management logs 330 and call logs 332 in database 510. In some examples, operation 608 further persists KPIs 511 in database 510, such as alarms; processor, memory usage, and storage usage data; and transactions per unit time.

In operation 610, orchestration engine 320 retrieves network management logs 330, call logs 332, KPIs 511, traffic patterns 512, and network topology 513 from database 510, and call log data from different call logs are associated by subscriber in operation 612. In operation 614, orchestration engine 320 identifying anomaly 333 in call logs 332 for a particular subscriber. Based on at least identifying anomaly 333, orchestration engine 320 generates one or more call event advisories 342 to initiate an automatic corrective action for anomaly 333, and/or generates alert 344, in operation 616.

In some examples, the automatic corrective action comprises deregistering an unauthorized user or initiating a network node event that is missing from call logs 332 (the call log data). Operation 618 transmits alert 344 to NOC 350.

Flowchart 600 performs the next operations 620 and 622 in parallel with operations 612-618. In operation 620, orchestration engine 320 identifies that network node 402 is operating in a degraded manner, for example using criteria 310 along with network management logs 330, call logs 332, traffic patterns 512, network topology 513, and KPIs 511. Orchestration engine 320 generates health advisories 341 in operation 622. In operation 624, traffic orchestrator 500 distributes traffic advisories 340 (health advisories 341 and call event advisories 342) to select ones of network nodes 300. For example, health advisories 341 are distributed to other network nodes 408 of wireless network 110, that are using network node 402, to steer at least portion 412 of traffic 410 away from network node 402 to alternate route 414 (thereby rebalancing traffic in wireless network 110). Call event advisories 342 are distributed to network nodes that need to perform an automatic corrective action for anomaly 333 (e.g., node 416).

Traffic 410 is rerouted and the corrective action for anomaly 333 is performed in operation 626. Decision operation 628 determines whether network node 402 has recovered. If traffic orchestrator 500 identifies that network node 402 is no longer operating in a degraded manner in decision operation 628, traffic orchestrator 500 generates and distributes further traffic advisories 340 indicating that network node 402 is no longer operating in a degraded manner, in operation 630. Other network nodes 408 may then resume routing the full allocation of traffic 410 to network node 402.

If network node 402 has not recovered, decision operation 632 determines whether network node 402 is fit for traffic. If so, flowchart 600 returns to decision operation 628 to monitor network node 402 for recovery or remaining in a degraded state. If, however, orchestration engine 320 identifies that network node 402 is not fit for traffic in decision operation 632, flowchart 600 moves to operation 634. Orchestration engine 320 may use criteria 315 along with network management logs 330, call logs 332, traffic patterns 512, network topology 513, and KPIs 511 in decision operation 632.

Based on at least identifying that network node 402 is not fit for traffic, traffic orchestrator 500 generates and distributes further traffic advisories 340 (health advisories 341) to other network nodes 408 to steer all traffic away from network node 402 to alternate route 414, in operation 634. Traffic 410 is fully rerouted in operation 636. In operation 638, traffic orchestrator 500 identifies to network repository 203 that network node 402 is unavailable. Network repository 203 marks network node 402 as unavailable and will not assign network node 402 to any new traffic sessions until network node 402 recovers.

In decision operation 640, traffic orchestrator 500 determines whether network node 402 is available and no longer operating in a degraded manner. If not, flowchart 600 remains at decision operation 640, at least with respect to network node 402. When traffic orchestrator 500 (performing decision operation 640) identifies that network node 402 is available and is not operating in a degraded manner, traffic orchestrator 500 identifies to network repository 203 that network node 402 is available, in operation 642.

In operation 644, self-learning component 322 monitors conditions of wireless network 110 subsequent to distributing traffic advisories 340, and orchestration engine 320 performs self-learning to improve determination of when and/or where to distribute a traffic advisory and/or to improve traffic advisory content, in operation 646.

Figure 7:
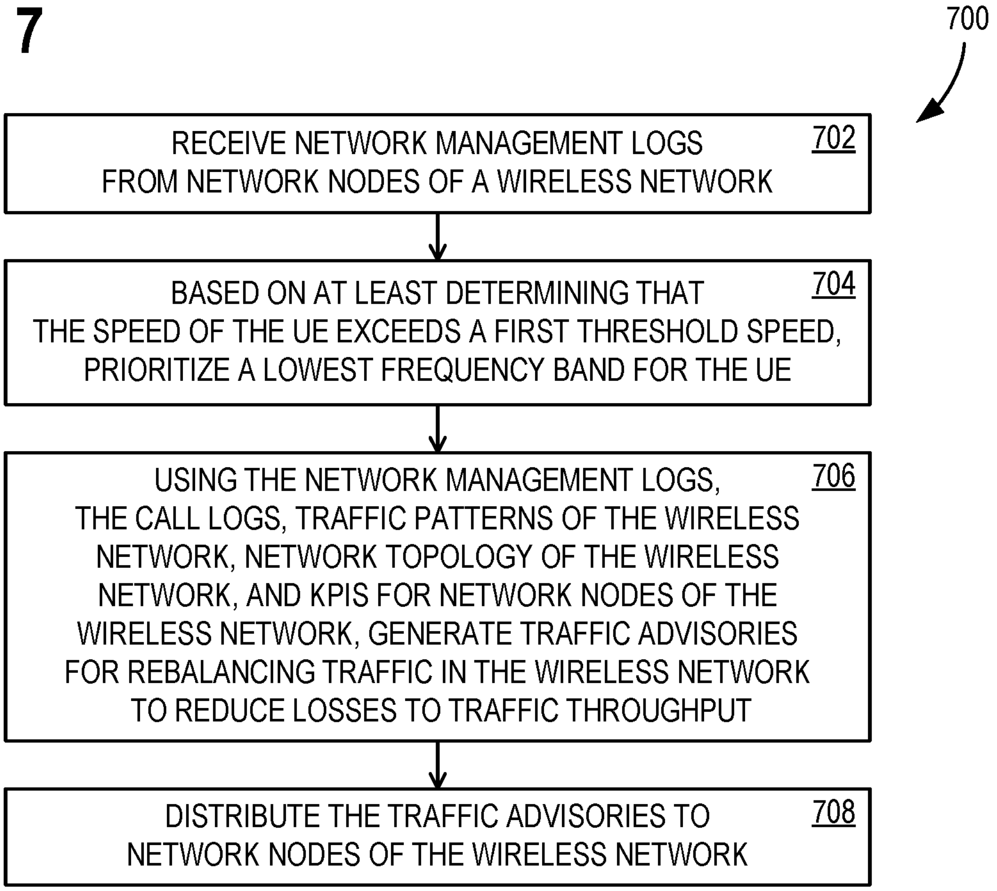

FIG. 7 illustrates a flowchart 700 of exemplary operations associated with examples of architecture 100. In some examples, at least a portion of flowchart 700 may be performed using one or more computing devices 800 of FIG. 8. Flowchart 700 commences with operation 702, which includes receiving network management logs from network nodes of a wireless network.

Operation 704 includes receiving call logs from network nodes of the wireless network. Operation 706 includes using the network management logs, the call logs, traffic patterns of the wireless network, network topology of the wireless network, and KPIs for network nodes of the wireless network, generating traffic advisories for rebalancing traffic in the wireless network to reduce losses to traffic throughput. Operation 708 includes distributing the traffic advisories to network nodes of the wireless network.

Figure 8:
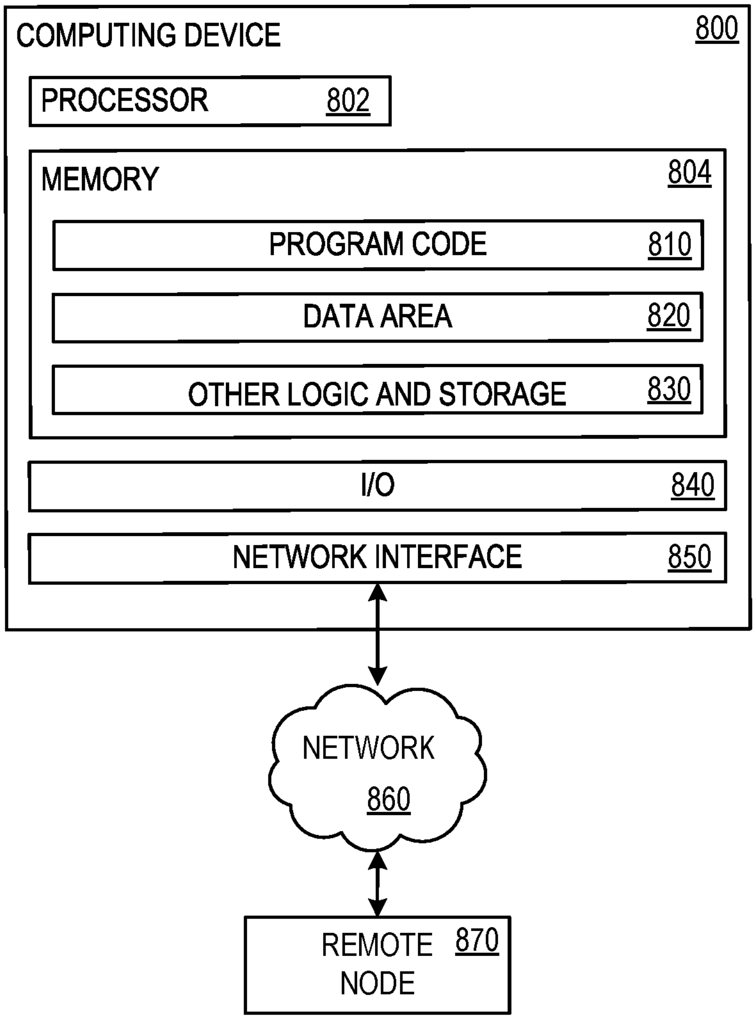
FIG. 8 illustrates a block diagram of a computing device suitable for implementing various aspects of the disclosure.

FIG. 8 illustrates a block diagram of computing device 800 that may be used as any component described herein that may require computational or storage capacity. Computing device 800 has at least a processor 802 and a memory 804 that holds program code 810, data area 820, and other logic and storage 830. Memory 804 is any device allowing information, such as computer executable instructions and/or other data, to be stored and retrieved. For example, memory 804 may include one or more random access memory (RAM) modules, flash memory modules, hard disks, solid-state disks, persistent memory devices, and/or optical disks. Program code 810 comprises computer executable instructions and computer executable components including instructions used to perform operations described herein. Data area 820 holds data used to perform operations described herein. Memory 804 also includes other logic and storage 830 that performs or facilitates other functions disclosed herein or otherwise required of computing device 800. An input/output (I/O) component 840 facilitates receiving input from users and other devices and generating displays for users and outputs for other devices. A network interface 850 permits communication over external network 860 with a remote node 870, which may represent another implementation of computing device 800. For example, a remote node 870 may represent another of the above-noted nodes within architecture 100.

ADDITIONAL EXAMPLES

An example traffic orchestrator for a wireless network comprises: a set of log receivers comprising a network management log receiver and a call log receiver, wherein the network management log receiver receives network management logs from network nodes of the wireless network, and wherein the call log receiver receives call logs from network nodes of the wireless network; an orchestration engine operable to receive the network management logs and the call logs via the set of log receivers and use the network management logs, the call logs, traffic patterns of the wireless network, network topology of the wireless network, and KPIs for network nodes of the wireless network to generate traffic advisories for rebalancing traffic in the wireless network to reduce losses to traffic throughput; and a traffic advisor operable to distribute the traffic advisories to network nodes of the wireless network.

An example system comprises: a processor; and a computer-readable medium storing instructions that are operative upon execution by the processor to:

An example method of wireless communication comprises: receiving network management logs from network nodes of a wireless network; receiving call logs from network nodes of the wireless network; using the network management logs, the call logs, traffic patterns of the wireless network, network topology of the wireless network, and KPIs for network nodes of the wireless network, generating traffic advisories for rebalancing traffic in the wireless network to reduce losses to traffic throughput; and distributing the traffic advisories to network nodes of the wireless network.

One or more example computer storage devices has computer-executable instructions stored thereon, which, upon execution by a computer, cause the computer to perform operations comprising: receiving network management logs from network nodes of a wireless network; receiving call logs from network nodes of the wireless network; using the network management logs, the call logs, traffic patterns of the wireless network, network topology of the wireless network, and KPIs for network nodes of the wireless network, generating traffic advisories for rebalancing traffic in the wireless network to reduce losses to traffic throughput; and distributing the traffic advisories to network nodes of the wireless network.

Alternatively, or in addition to the other examples described herein, examples include any combination of the following:

- persisting at least the network management logs and the call logs in a database;
- retrieving the network management logs, the call logs, and the network topology from the database;
- performing an ETL process to transform the network management logs and the call logs into a form used for storage in the database;
- associating call log data from different call logs by subscriber;
- identifying an anomaly in call log data for a particular subscriber;
- based on at least identifying the anomaly, generating a traffic advisory to initiate an automatic corrective action for the identified anomaly or generating an alert;
- monitoring conditions of the wireless network subsequent to distributing the traffic advisories;

performing self-learning to improve determination of when and/or where to distribute a traffic advisory;

performing self-learning to improve traffic advisory content;

identifying that the first network node of the wireless network is operating in a degraded manner;

based on at least identifying that the first network node of the wireless network is operating in a degraded manner, generating and distributing traffic advisories to other network nodes of the wireless network, that are using the first network node, to steer at least a portion of traffic away from the first network node to an alternate route;

identifying that the first network node is no longer operating in a degraded manner;

based on at least identifying that the first network node of the wireless network is no longer operating in a degraded manner, generating and distributing traffic advisories indicating that the first network node is no longer operating in a degraded manner;

identifying that the first network node is not fit for traffic;

based on at least identifying that the first network node of the wireless network is not fit for traffic, generating and distributing traffic advisories to the other network nodes, that are using the first network node, to steer all traffic away from the first network node to an alternate route;

based on at least identifying that the first network node of the wireless network is not fit for traffic, identifying to a network repository, that holds availability information for network nodes of the wireless network, that the first network nodes is unavailable;

identifying that the first network node is available and not operating in a degraded manner;

based on at least identifying that the first network node of the wireless network available and not operating in a degraded manner, identifying to the network repository that the first network node is available;

the traffic orchestrator is operable to persist at least the network management logs and the call logs in a database;

the orchestration engine receives the network management logs, the call logs, and the network topology from the database;

the ETL process is disposed between the set of log receivers and the database;

the ETL process is operable to transform information received from the set of log receivers to a form used for storage in the database;

the traffic orchestrator is operable to associate call log data from different call logs by subscriber;

the traffic orchestrator is operable to identify an anomaly in call log data for a particular subscriber;

the traffic orchestrator is operable to, based on at least identifying the anomaly, generate a traffic advisory to initiate an automatic corrective action for the identified anomaly or generate an alert;

the traffic orchestrator is operable to monitor conditions of the wireless network subsequent to distributing the traffic advisories;

the orchestration engine is operable to perform self-learning to improve determination of when and/or where to distribute a traffic advisory;

the orchestration engine is operable to perform self-learning to improve traffic advisory content;

the network management logs comprise FCAPS logs for network nodes of the wireless network;

the centralized traffic orchestrator comprises the database;

the orchestration engine comprises ML and/or AI;

the automatic corrective action comprises deregistering an unauthorized user;

the automatic corrective action comprises initiating a network node event missing from the call log data for the particular subscriber;

the orchestration engine further receives the traffic patterns and KPIs from the database;

the orchestration engine associates the call log data from different call logs by subscriber;

the orchestration engine identifies the anomaly in the call log data for a particular subscriber; the orchestration engine generates the traffic advisory to initiate the automatic corrective action;

the traffic advisories comprise health advisories and call event advisories;

the health advisories rebalance traffic in the wireless network;

the call event advisories initiate automatic corrective actions for the identified anomalies in the call log data;

the KPIs include alarms; processor, memory usage, and storage usage data; and transactions per unit time;

criteria for identifying a network node as degraded include a first processor load threshold, a first memory usage threshold, and/or a first storage usage threshold;

criteria for identifying a network node as not fit for traffic include a second processor load threshold, a second memory usage threshold, a second storage usage threshold, and/or an alarm;

transmitting the alert to a NOC;

the network repository comprises an NRF; and the wireless network comprises a 5G cellular network.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure. It will be understood that the benefits and advantages described above may relate to one embodiment or may relate to several embodiments. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes may be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A method of wireless communication, the method comprising:

receiving, at a traffic orchestrator, network management logs and call logs from network nodes of a wireless network;

receiving from a database at the traffic orchestrator, traffic patterns of the wireless network, network topology of the wireless network, and Key Performance Indicators (KPIs) of the wireless network, wherein the KPIs include at least processor usage, memory usage, and storage usage data;

identifying, at the traffic orchestrator, degraded manner degraded network node prior to a failure associated with the degraded network node being detected or otherwise reported by the wireless network, wherein identifying the degraded network node is based upon the network management logs, the call logs, the traffic patterns, the network topology, and the KPIs, of the wireless network; an generating at the traffic orchestrator, at least a first traffic advisory for rebalancing traffic in the wireless network to reduce traffic throughput through the degraded network node; and sending the first traffic advisory to at least a second network node, the first traffic advisory prompting the second network node to autonomously update at least one parameter to reduce the traffic throughput through the degraded network node.

2. The method of claim 1, further comprising persisting at least the network management logs and the call logs in the database.

3. The method of claim 2, further comprising:

performing an extract, transform, load (ETL) process to transform the network management logs and the call logs into a form used for storage in the database.

4. The method of claim 1, further comprising:

associating call log data from different call logs by subscriber;

identifying an anomaly in the call log data for a particular subscriber; and based on at least identifying the anomaly, generating at least a second traffic advisory to initiate an automatic corrective action for the identified anomaly or generating an alert.

5. The method of claim 1, further comprising:

monitoring conditions of the wireless network subsequent to distributing the first traffic advisory; and either:

performing self-learning to improve determination of when and/or where to distribute the first traffic advisory; or performing self-learning to improve traffic advisory content.

6. The method of claim 1, wherein the first traffic advisory prompts the second network node to steer at least a portion of traffic away from the degraded network node to an alternate route, and wherein the method further comprises:

identifying that the degraded network node is no longer operating in a degraded manner; and based on at least identifying that the degraded network node of the wireless network is no longer operating in the degraded manner, generating a second traffic advisory indicating that the degraded network node is no longer operating in the degraded manner and distributing the second traffic advisory to at least the second network node.

7. The method of claim 1, wherein the first traffic advisory prompts the second network node to steer at least a portion of traffic away from the degraded network node to an alternate route, and wherein the method further comprises:

identifying that the degraded network node is not fit for traffic;

based on at least identifying that the degraded network node of the wireless network is not fit for traffic, generating a second traffic advisory indicating that the degraded network node is not fit for traffic and distributing the second traffic advisory to at least the second network node, the second traffic advisory prompting the second network node to steer remaining portions of the traffic away from the degraded network node to an alternate route.

8. A system comprising:

a traffic orchestrator for a wireless network, the traffic orchestrator comprising:

a set of log receivers comprising a network management log receiver and a call log receiver, wherein the network management log receiver receives network management logs from network nodes of the wireless network, and wherein the call log receiver receives call logs from the network nodes of the wireless network;

an orchestration engine operable to receive:

the network management logs and the call logs via the set of log receivers, and traffic patterns of the wireless network, network topology of the wireless network, and key performance indicators (KPIs) of the wireless network from a database, wherein the KPIs include at least processor usage, memory usage, and storage usage data;

the orchestration engine further operable to:

identify a degraded network node prior to a failure associated with the degraded network node being detected or otherwise reported by the wireless network, wherein identifying the degraded network node is based upon the network management logs, the call logs, the traffic patterns, the network topology, and the KPIs of the wireless network, and generate at least a first traffic advisory for rebalancing traffic in the wireless network to reduce traffic throughput through the degraded network node; and a traffic advisor operable to distribute at least the first traffic advisory to at least a second network node of the wireless network, the first traffic advisory prompting the second network node to autonomously update at least one parameter to reduce traffic throughput through the degraded network node.

9. The system of claim 8, wherein the traffic orchestrator is operable to persist at least the network management logs and the call logs in the database.

10. The system of claim 9, further comprising:

an extract, transform, load (ETL) process disposed between the set of log receivers and the database, operable to transform information received from the set of log receivers to a form used for storage in the database.

11. The system of claim 8, wherein the traffic orchestrator is further operable to:

associate call log data from different call logs by subscriber;

identify an anomaly in the call log data for a particular subscriber; and based on at least identifying the anomaly, generate at least a second traffic advisory to initiate an automatic corrective action for the identified anomaly or generate an alert.

12. The system of claim 8, wherein the traffic orchestrator is further operable to:

monitor conditions of the wireless network subsequent to distributing at least the first traffic advisory; and wherein the orchestration engine is further operable to either:

perform self-learning to improve determination of when and/or where to distribute a traffic advisory; or perform self-learning to improve traffic advisory content.

13. The system of claim 8, wherein the first traffic advisory prompts the second network node to steer at least a portion of traffic away from the degraded network node to an alternate route, and wherein the traffic orchestrator is further operable to:

identify when the degraded network node is no longer operating in a degraded manner; and based on at least identifying that the degraded network node of the wireless network is no longer operating in the degraded manner, generate a second traffic advisory indicating that the degraded network node is no longer operating in the degraded manner and distribute the second traffic advisory to at least the second network node.

14. The system of claim 8, wherein the first traffic advisory prompts the second network node to steer at least a portion of traffic away from the degraded network node to an alternate route, and wherein the traffic orchestrator is further operable to:

identify when the degraded network node is not fit for traffic;

based on at least identifying that the degraded network node of the wireless network is not fit for traffic, generate a second traffic advisory indicating that the degraded network node is not fit for traffic and distribute the second traffic advisory to at least the second network node, the second traffic advisory prompting the second network node to steer remaining portions of the traffic away from the degraded network node to the alternate route.

15. One or more computer storage devices having computer-executable instructions stored thereon, which, upon execution by a computer, cause the computer to perform operations comprising:

receive, at a traffic orchestrator, network management logs and call logs from network nodes of a wireless network;

receive from a database at the traffic orchestrator, traffic patterns of the wireless network, network topology of the wireless network, and Key Performance Indicators (KPIs) of the wireless network, wherein the KPIs include at least processor usage, memory usage, and storage usage data;

identify, at the traffic orchestrator, a degraded network node prior to a failure associated with the degraded network node being detected or otherwise reported by the wireless network, wherein identifying the degraded network node is based upon the network management logs, the call logs, the traffic patterns, the network topology, and the KPIs, of the wireless network;

generate, at the traffic orchestrator, at least a first traffic advisory for rebalancing traffic in the wireless network to reduce traffic throughput through the degraded network node, and distribute the at least the first traffic advisory to at least a second network node of the wireless network, the first traffic advisory prompting the second network node to autonomously update at least one parameter to reduce traffic throughput through the degraded network node.

16. The one or more computer storage devices of claim 15, wherein the operations further comprise persisting at least the network management logs and the call logs in the database.

17. The one or more computer storage devices of claim 16, wherein the operations further comprise:

performing an extract, transform, load (ETL) process to transform the network management logs and the call logs into a form used for storage in the database.

18. The one or more computer storage devices of claim 15, wherein the operations further comprise:

associating call log data from different call logs by subscriber;

identifying an anomaly in the call log data for a particular subscriber; and based on at least identifying the anomaly, generating at least a second traffic advisory to initiate an automatic corrective action for the identified anomaly or generating an alert.

19. The one or more computer storage devices of claim 15, wherein the operations further comprise:

monitoring conditions of the wireless network subsequent to distributing the first traffic advisory; and either:

performing self-learning to improve determination of when and/or where to distribute a traffic advisory; or performing self-learning to improve traffic advisory content.

20. The one or more computer storage devices of claim 15, wherein the first traffic advisory prompts the second network node to steer at least a portion of traffic away from the degraded network node to an alternate route, and wherein the operations further include identifying that the degraded network node is no longer operating in a degraded manner; and based on at least identifying that the degraded network node of the wireless network is not fit for traffic, generate a second traffic advisory indicating that the degraded network node is no longer operating in the degraded manner and distribute the second traffic advisory to at least the second network node, the second traffic advisory prompting the second network node to steer remaining portions of the traffic away from the degraded network node to the alternate route.

* * * * *